United States Patent [19]
Yamamoto

[11] Patent Number: 5,464,458
[45] Date of Patent: Nov. 7, 1995

[54] SYSTEM FOR PURIFYING EXHAUST GAS

[76] Inventor: Isao Yamamoto, 507-1, Nakatajima-cho, Hamamatsu-shi, Shizuoka-ken, Japan

[21] Appl. No.: 254,936

[22] Filed: Jun. 7, 1994

[30] Foreign Application Priority Data

Apr. 5, 1994 [JP] Japan .................................. 6-090550

[51] Int. Cl.⁶ .................................................. B01D 47/12
[52] U.S. Cl. .............................. 55/223; 55/225; 55/226; 55/228; 55/259; 55/276; 55/DIG. 30
[58] Field of Search ........................... 55/220, 223, 225, 55/226, 228, 229, 235, 259, 261, 276, DIG. 30

[56] References Cited

U.S. PATENT DOCUMENTS

| | | | |
|---|---|---|---|
| 1,061,775 | 5/1913 | Newton et al. | 55/276 |
| 1,187,208 | 6/1916 | Wahl | 55/228 |
| 3,292,913 | 12/1966 | Craig | 55/228 X |
| 3,343,341 | 9/1967 | Wiemer | 55/226 X |
| 3,353,335 | 11/1967 | Caballero | 55/223 X |
| 3,353,336 | 11/1967 | Caballero | 55/228 |
| 3,391,521 | 7/1968 | Pal | 55/259 X |
| 3,465,504 | 9/1969 | Oropeza et al. | 55/228 |
| 3,677,364 | 7/1972 | Pawlina | 55/276 X |
| 3,795,089 | 3/1974 | Reither | 55/228 X |
| 3,800,505 | 4/1974 | Tarves, Jr. | 55/223 X |
| 3,920,425 | 11/1975 | Grantham | 55/228 X |
| 4,230,465 | 10/1980 | Hope | 55/261 X |
| 4,301,652 | 11/1981 | Sohda et al. | 55/228 X |
| 4,315,559 | 2/1982 | Casey | 55/276 X |
| 4,609,386 | 9/1986 | Sibley et al. | 55/223 |
| 4,712,643 | 12/1987 | Iles et al. | 55/276 X |
| 4,821,513 | 4/1989 | Pickering | 55/259 X |
| 5,048,287 | 9/1991 | Howe et al. | 55/276 X |
| 5,123,936 | 6/1992 | Stone et al. | 55/223 X |
| 5,125,938 | 6/1992 | Gamez Anguiano | 55/276 |

Primary Examiner—Robert Spitzer
Attorney, Agent, or Firm—Flynn, Thiel, Boutell & Tanis

[57] ABSTRACT

A system for purifying exhaust gas comprising a cylindrical body portion formed by continuously arranging a plurality of chambers in line, a nozzle for jetting a pressurized fluid into at least one chamber, a pressure device for feeding the fluid through a passage to the nozzle, a fluid reservoir connected to the pressure device through a first feed passage, a collection portion provided in the one chamber, a collected fluid reservoir connected to the collection portion through a collection passage, a drawing device disposed mid-way of the collection passage and adapted to collect the fluid and a product separated from an exhaust gas by the fluid discharged from the nozzle, the collected fluid reservoir and the pressure device communicating with each other through a second feed passage, and a control device controlling the nozzle, the pressure device and the drawing device to purify the exhaust gas.

8 Claims, 5 Drawing Sheets

SYSTEM FOR PURIFYING EXHAUST GAS

FIELD OF THE INVENTION

This invention relates to an exhaust gas purification system, and particularly to an exhaust gas purification system for purifying exhaust gas of a loaded vehicle engine.

BACKGROUND OF THE INVENTION

Engine generally refers to a gasoline engine, a diesel engine, a rotary engine, etc. A discharge system of an engine is provided with a catalyst for purifying exhaust gas and a noise eliminator, typically called a silencer or muffler, to reduce discharge noise.

The catalyst typically includes an oxidation catalyst, a reduction catalyst and a three-way catalyst. The configuration of such catalyst is of pellet type, Morris type (platelike) or the like.

The oxidation catalyst reduces the CO (carbon monoxide) and the HC (hydrocarbon) contained in the exhaust gas utilizing oxidation phenomenon, while the reduction catalyst reduces the NOx (nitrogen oxides) contained in the exhaust gas by reduction. The remaining three-way catalyst reduces the components of CO, HC and NOx contained in the exhaust gas.

Recently, there is a tendency for severely restricting the exhaust gas particularly from those vehicles having a diesel engine. Various countermeasures for the carbon contained in the exhaust gas as "black smoke" are being studied.

In the diesel engine, a light oil is sprayed into the drawn air after the air has been strongly compressed, thereby exploding the air and light oil without ignition. Since the diesel engine does not have a carburetor, as in a gasoline engine, the draw efficiency of air is high. Moreover, since the combustion time is long, the thermal efficiency is high. In addition, since the fuel consumption is less compared with the gasoline engine, the diesel engine is economical.

However, the diesel engine has inconveniences in that since the compressive pressure and explosive pressure are high, the weight of the diesel engine is increased and sounds and vibrations are increased, with the result that the maximum engine speed cannot be raised and a small size is difficult to obtain. Because of the reasons just mentioned, the diesel engine is generally used only on large vehicles.

In the conventional system for purifying exhaust gas, a three-way catalyst, for example, is provided on an intermediate part of a discharge system of the engine so that CO, HC and NOx as harmful components contained in the exhaust gas can be reduced. However, the three-way catalyst only has the function for reducing these three components, does not have the function for collecting carbon as a harmful component contained in the exhaust gas discharged from vehicles having a diesel engine.

The noise eliminator only has the function of reducing the discharge noise from a gasoline or diesel engine, and does not have the function of collecting carbon as a harmful component contained in the exhaust gas discharged from vehicles having a diesel engine.

As a result, there is such an inconvenience that carbon as black smoke is discharged from vehicles having a diesel engine, thus creating one of the causes of air pollution.

On the other hand, there is no device for spraying a fluid into an exhaust gas and collecting harmful components such as CO, HC, NOx, carbon, etc., and a development of such device is keenly needed.

Therefore, according to the present invention, in order to obviate the above inconveniences, there is provided a system for purifying exhaust gas comprising a cylindrical body portion formed by continuously arranging a plurality of chambers in line, a nozzle portion for jetting a fluid of a predetermined pressure in at least one chamber of the body portion, a compression portion for feeding a pressurized fluid through a pressure feed passage so that the fluid is jetted from the nozzle portion, a fluid reservoir portion connected to the compression portion through a first feed passage, a collection portion provided in the chamber, a collected fluid reservoir portion connected to the collection portion through a collection passage, a collection-use drawing portion disposed mid-way of the collection passage and adapted to collect the fluid and a product separated from an exhaust gas by the fluid from the nozzle portion, the collected fluid reservoir portion and the compression portion communicating with each other through a second feed passage, and control means communicating with and controlling the nozzle portion, compression portion and collection-use drawing portion in order to purify the exhaust gas.

By virtue of the accomplishment of the present invention thus constructed, when products are to be collected from the exhaust gas, a fluid of a predetermined pressure is jetted from a nozzle into at least one chamber of the body portion to cool the exhaust gas by the fluid so that the products are separated from the exhaust gas, the fluid and products are collected from a collection portion of the chamber, the fluid is returned to the collected fluid reservoir portion through the drawing portion, and the products are effectively removed from the exhaust gas.

DETAILED DESCRIPTION

Figure 1:
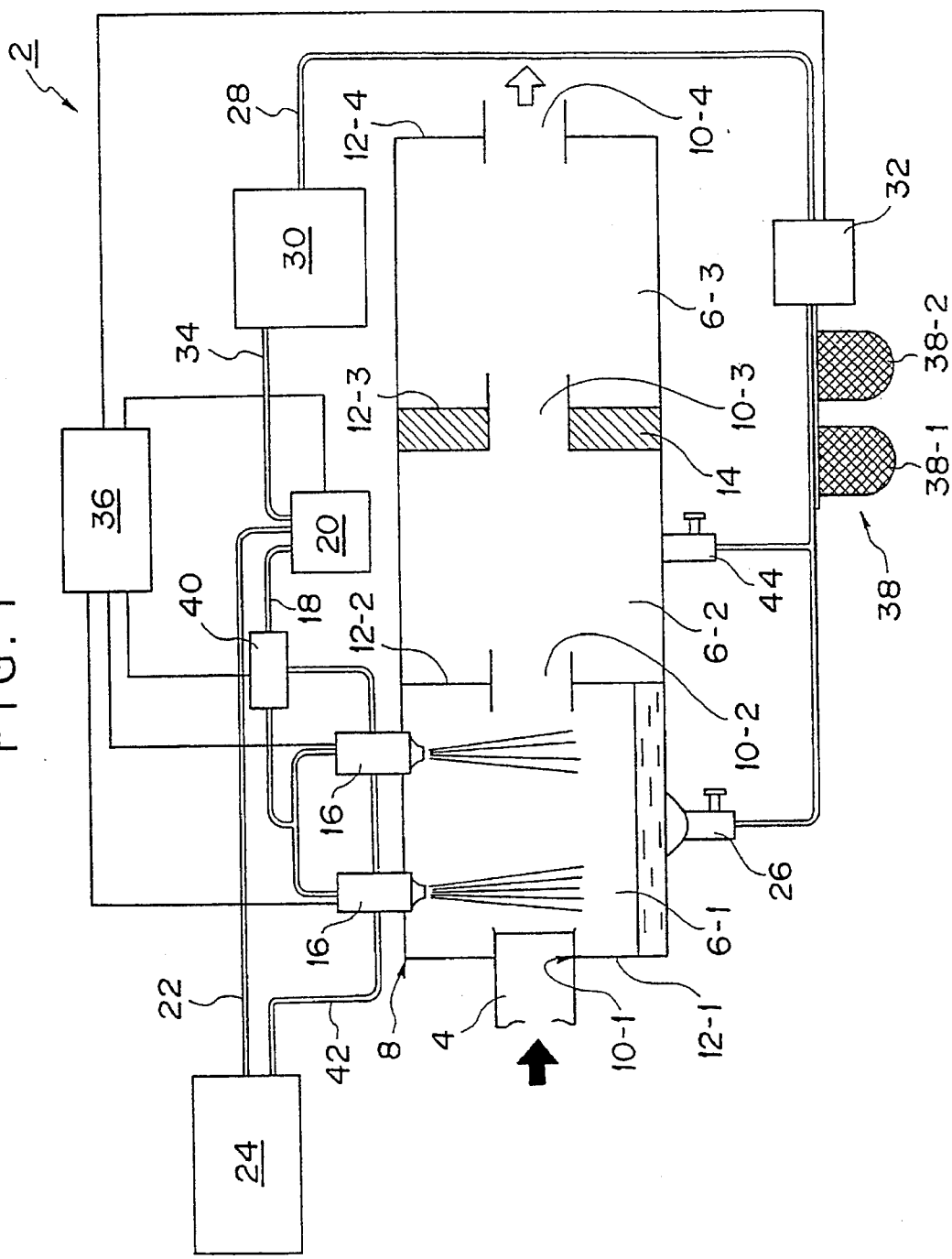
FIG. 1 is a schematic view of a body portion of a system for purifying exhaust gas according to a first embodiment of the present invention.
Figure 2:
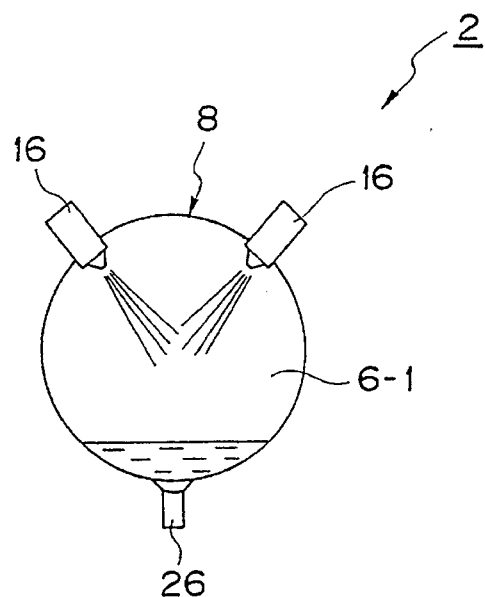
FIG. 2 is a schematic sectional view of a first chamber.
Figures 3A, 3B, 3C, 3D:
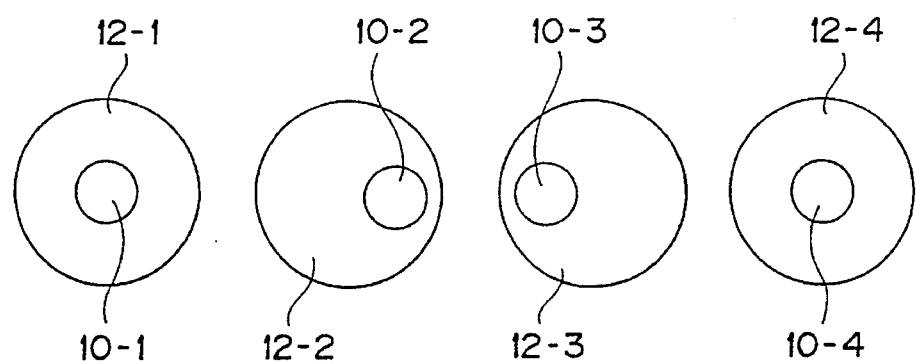
FIGS. 3(a) through 3(d) are schematic views showing the opening positions of first to fourth openings, respectively, as formed in the body portion.

FIGS. 1 to 3 show a first embodiment of the present invention. In FIG. 1, reference numeral 2 denotes a system for purifying exhaust gas, and 4 denotes a discharge pipe of an engine such as, for example, a diesel engine (not shown).

The exhaust gas purifying system 2 includes a cylindrical body portion 8 formed by continuously arranging a plurality (for example, three) of first to third chambers 6-1, 6-2 and 6-3 in line. The downstream end portion of the discharge pipe 4 is connected to a first opening 10-1 which communicates with one end of the first chamber 6-1. This first opening 10-1 is formed in a first partition wall 12-1. A second opening 10-2 communicates the first chamber 6-1 with the second chamber 6-2 and is formed in a second partition wall 12-2; a third opening 10-3 communicates the second chamber 6-2 with the third chamber 6-3 and is formed in a third partition wall 12-3; and a fourth opening 10-4 communicates the third chamber 6-3 with an external portion and is formed in a fourth partition wall 12-4.

With respect to positions of the first to fourth openings 10-1, 10-2, 10-3 and 10-4, as respectively shown in FIGS. 3(*a*) to 3(*d*), the first opening 10-1 is formed in a central part of the first partition wall 12-1 and in fact is generally aligned with the axis of the cylindrical body 8; the second opening 10-2 is formed in the partiiion 12-2 so as to be offset rightwardly from the center of the second partition wall 12-2 (i.e. rightwardly of the axis of body 8); the third opening 10-3 is formed in the partition 12-3, in a position offset leftwardly from the center of the third partition wall 12-3 (i.e. leftwardly of the axis of body 8); and the fourth opening 10-4 is formed in a central part of the fourth partition wall 12-4 so as to be generally aligned with the axis of body 8.

A rear end side of the third partition wall 12-3 (i.e. the side facing the second chamber 6-2) is provided with a member 14 for shielding liquid, for example, moisture. This moisture shield member 14 is heated to a high temperature by discharge heat to evaporate the moisture passing therethrough. In the case where a large quantity of moisture is passing, the moisture shield member 14 liquidizes the moisture so that the liquidized moisture is dropped to a bottom portion of the second chamber 6-2.

The system 2 includes a nozzle 16 for jetting a fluid, for example water as a liquid, of a predetermined pressure into at least one chamber 6-1 of the body portion 8; a compression portion 20 for feeding, under pressure, fluid through a pressure feed passage 22 so that the fluid is jetted from the nozzle 16; a fluid reservoir portion 24 connected to the compression portion 20 through the feed passage 22; a collection portion 26 provided in the chamber 6-1; a collected fluid reservoir portion 30 connected to the collection portion 26 through a collection passage 28; a collection-use drawing portion 32 disposed mid-way of the collection passage 28 and adapted to collect the water as the fluid and a product separated from an exhaust gas by the water from the nozzle 16; the collected fluid reservoir portion 30 and the compression portion 20 being communicated with each other through a second feed passage 34; and control means 36 communicating with the nozzle 16, the compression portion 20 and the collection-use drawing portion 32 to control and purify the exhaust gas.

A separation portion, for example filter 38, is provided between the collection portion 26 and the collection-use drawing portion 32 at an intermediate part of the collection passage 28. This filter is for separating a product composed of carbon made by pulverizing the components contained in the exhaust gas cooled by atomized water from the nozzle 16, and the water from the nozzle 16.

In the first chamber 6-1, nozzles 16 are arranged at two locations of front and rear parts of the chamber, and one or a plurality of the nozzles 16 are arranged so as to direct the discharged or jetted water toward the central part or axis of the first chamber 6-1 as shown in FIG. 2.

A regulator 40 for regulating the jet pressure of the fluid, for example water, to a predetermined pressure is disposed at an intermediate part of a pressure feed passage 18 for communicating the nozzle 16 with the compression portion 20, the latter comprising a pump. The regulator 40 and fluid reservoir portion 24 communicate with each other through a return passage 42 so that excessive pressure in the regulator 40 is returned to the fluid reservoir portion 24 through the return passage 42.

As shown in FIGS. 1 and 2, the collection portion 26 (as a main collecting device) is provided on a bottom portion of the first chamber 6-1 and a preliminary collection portion 44 (as a subsidiary collecting device) is provided on a bottom portion of the second chamber 6-2. The collected fluid reservoir portion 30 is connected to the collection portions 26 and 44 through the collection passage 28. Two filters 38-1 and 38-2, for example, for separating the water and the carbon, and the collection-use drawing portion 32 comprising a drawing pump, are provided at an intermediate part of the collection passage 28.

The first and second filters 38-1 and 38-2 are formed of ceramic or other materials and are of a removable cartridge type so that a predetermined process can be performed after the collection of the product.

Water of about fifty liters in total is supplied to the fluid reservoir portion 24 and the collected fluid reservoir portion 30.

The four nozzles 16, compression portion or pump 20, collection-use drawing portion or pump 32 and regulator 40 are connected to the control means 36 which preferably comprises a computer, and are controlled to carry out a predetermined collecting operation in accordance with control signals from the control means 36.

In the case where a vehicle (not shown) has a computer, the control means 36 can use this computer. In the case where the vehicle does not have a computer, a computer may simply be provided on the vehicle.

The operation of the embodiment of FIGS. 1-3 will now be described:

For collecting a product such as carbon contained in the exhaust gas, atomized water of a predetermined pressure is jetted from the nozzles 16 into the first chamber 6-1 of the body portion 8 by the pressurized water jetting (scrubber) system. The exhaust gas flowing through the discharge pipe 4 in the chamber 6-1 is rapidly cooled by the atomized water so that the components contained in the exhaust gas are precipitated to produce a carbon product.

The water and carbon product drop to the bottom portion of the first chamber 6-1, are collected from the collection portion 26, and are then separated by the first and second filters 38-1 and 38-2. The water, after separation, is returned to the collected fluid reservoir portion 30 through the passage 28 by the pump 32. The carbon product is collected by the first and second filters 38-1 and 38-2 which are detached at predetermined time or use intervals so as to be cleaned or replaced.

The water returned to the reservoir portion 30 is supplied to the compression portion (i.e. pump) 20 by the second feed passage 34 so as to be again jetted into the first chamber 6-1.

By doing the above, about 80% of the carbon as a product can be removed from the exhaust gas. As a result, the discharge amount of black smoke can be reduced to obviate a cause or factor for air pollution. This is advantageous in view of practical use.

Since the jetting quantity of water can be changed by the control means 36 in accordance with a driving condition of the vehicle, the carbon can be effectively collected, and therefore the convenience of use is enhanced.

Furthermore, in a discharge system for a vehicle, if the body portion 8 is provided downstream of a noise eliminator (not shown), possible pollution of the noise eliminator by the carbon can be avoided and both the function of purifying the exhaust gas and the function of eliminating noise can be obtained. This is thus advantageous in practical use.

Furthermore, in a discharge system of a vehicle, if the body portion 8 is provided upstream of a noise eliminator (not shown), a possible pollution of the noise eliminator by the carbon as a product can be avoided and both the function for purifying the exhaust gas and the function for eliminating noises of the noise eliminating function can be utilized and thus, this is advantageous in view of practical use.

Figure 4:
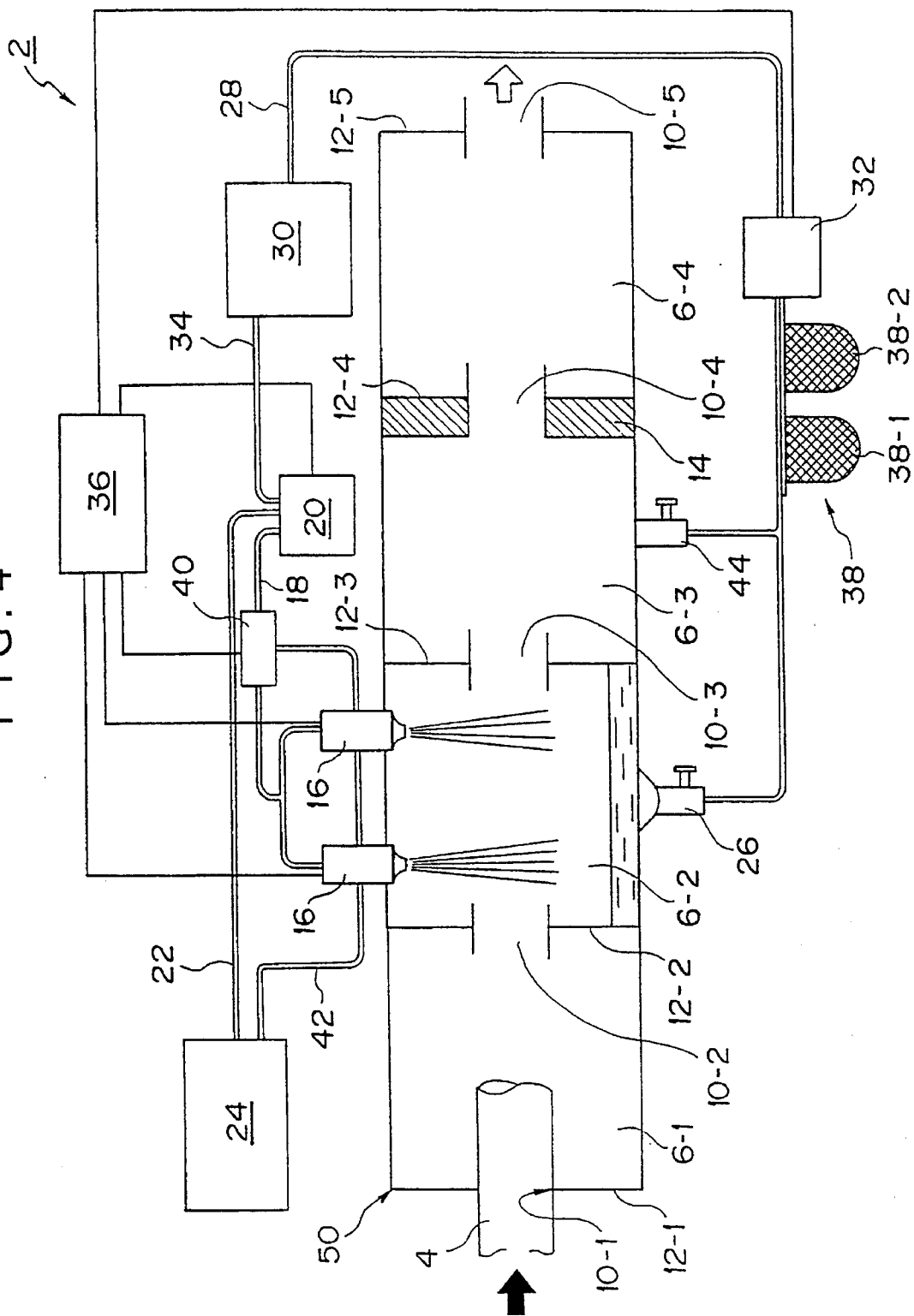
FIG. 4 is a schematic view of a noise eliminator according to a second embodiment of the present invention.
Figure 5:
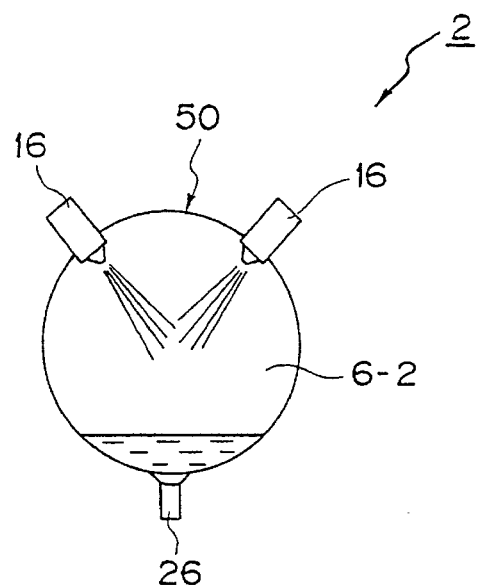
FIG. 5 is a schematic sectional view of the second chamber.
Figures 6A, 6B, 6C, 6D, 6E:
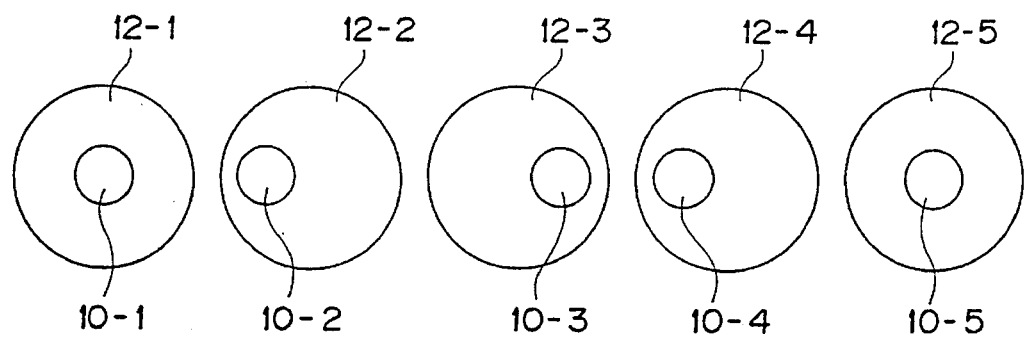
FIGS. 6(a) through 6(e) are schematic views showing the opening positions of the first to fifth openings, respectively, as formed in the noise eliminator.

FIGS. 4 to 6 show a second embodiment of the present invention. In this second embodiment, as well as in the third embodiment (FIG. 7) as described hereinafter, those portions exhibiting the same functions as those of the first embodiment are denoted by the same reference numerals and the description thereof is made using these same reference numerals.

The feature of this second embodiment is that the exhaust gas purifying system 2 is integrally formed with a noise eliminator 50 which is connected to the discharge system and operates to reduce discharge noise.

That is, the noise eliminator 50 is connected to a discharge or exhaust pipe 4 of an engine (not shown), such as a diesel engine, and is formed in a cylindrical elongate shape which is obtained by continuously arranging, for example, four chambers such as first to fourth expansion chambers 6-1, 6-2, 6-3 and 6-4 in line.

A downstream end portion of the discharge pipe 4 is connected to an upstream side of the noise eliminator 50 by a first opening 10-1 which communicates with the upstream portion of the first expansion chamber 6-1, which chamber.6-1 is formed in order to increase the noise eliminating function. This first opening 10-1 is formed in a first partition wall 12-1.

A second opening 10-2 communicates the first and second expansion chambers 6-1 and 6-2 and is formed in a second partition wall 12-2; a third opening 10-3 communicates the second and third expansion chambers 6-2 and 6-3 and is formed in a third partition wall 12-3; a fourth opening 10-4 communicates the third and fourth expansion chambers 6-3 and 6-4 and is formed in a fourth partition wall 12-4; and a fifth opening 10-5 communicates the fourth expansion chamber 6-4 with an external portion and is formed in a fifth partition wall 12-5.

As shown in FIGS. 6(a) to 6(e), the first opening 10-1 is formed at the center of the first partition wall 12-1 generally in alignment with the axis of the cylindrical body 8; the second opening 10-2 is formed at a position offset leftwardly from the center or axis of the second partition wall 12-2; the third opening 10-3 is formed at a position offset rightwardly from the center or axis of the third partition wall 12-3; the fourth opening 10-4 is formed at a position offset (as with the second opening 10-2) leftwardly from the center or axis of the fourth partition wall 12-4; and the fifth opening 10-5 is formed at the center of the fifth partition wall 12-5 aligned with the axis of the body 8.

A rear end side of the fourth partition wall 12-4 (i.e. the side facing the third expansion chamber 6-3) is provided with a member 14 for shielding moisture. This moisture shield member 14 is heated to a high temperature by discharge heat to evaporate the moisture passing therethrough. In the case where a large quantity of moisture is passing, the moisture shield member 14 liquidizes the moisture so that the liquidized moisture is dropped to a bottom portion of the third expansion chamber 6-3.

The system 2 includes a nozzle 16 for jetting water as an atomized fluid of predetermined pressure into the second expansion chamber 6-2 of the noise eliminator 50; a compression portion (i.e. a pump) 20 for feeding the water under pressure through a feed passage 18 so that the atomized water is jetted from the nozzle 16; a fluid reservoir 24 connected to the pump 20 through a feed passage 22; and a collection portion 26 provided on a bottom portion of the second expansion chamber 6-2.

The system 4 further includes a collected fluid reservoir 30 connected to the collection portion 26 through a passage 28, a filter 38 for separating the water and the carbon which is precipitated from the exhaust gas by the atomized water, and a drawing portion (i.e. a pump) 32 disposed mid-way of the collection passage 28, the reservoir 30 and the pump 20 being communicated with one another through a second feed passage 34, and control means 36 communicating with and controlling the nozzles 16, the pump 20 and the pump 32 in order to purify the exhaust gas.

In the second expansion chamber 6-2 of the noise eliminator 50, four nozzles 16 are arranged at four locations in total, i.e., two nozzles at each of the front and rear locations, with the nozzles being directed generally toward the center or axis of the second expansion chamber 6-2 as shown in FIG. 5.

A regulator 40 for regulating the jet pressure of the water to a predetermined pressure is disposed at an intermediate part of a pressure feed passage 18 which communicates the nozzle 16 with the pump 20. The regulator 40 and fluid reservoir 24 communicate with each other through a return passage 42 so that excessive pressure at the regulator 40 is returned to the reservoir 24 through the return passage 42.

As shown in FIGS. 4 and 5, a collection portion 26 (as a main collecting device) is provided on a bottom portion of the second expansion chamber 6-2, and a preliminary collection portion 44 (as a subsidiary collecting device) is provided on a bottom portion of the third expansion chamber 6-3. The fluid reservoir 30 is connected to the collection portions 26 and 44 through the collection passage 28. Two filters 38-1 and 38-2, for example, for separating the water and the carbon, and the pump 32 are provided at an intermediate part of the collection passage 28. The first and second filters 38-1 and 38-2 are formed of ceramic or other materials and are of a removable cartridge type so that a predetermined process can be performed after the collection of the product.

The four nozzles 16, pump 20, pump 32 and regulator 40 are connected to the control means 36 comprising a computer, and are controlled to carry out a predetermined collecting operation in accordance with control signals from the control means 36.

The operation of the embodiment of FIGS. 4–6 will now be described:

For collecting carbon contained in the exhaust gas by connecting the noise eliminator 50 to the discharge pipe 4 of the diesel engine, atomized water of a predetermined pressure is jetted from the nozzles 16 into the second expansion chamber 6-2 of the noise eliminator 50. The exhaust gas flowing down through the discharge pipe 4 is rapidly cooled by the atomized water so that the components contained in the exhaust gas are precipitated to produce a carbon product.

The water and carbon product drop to the bottom portion of the second expansion chamber 6-2, are collected from the collection portion 26, and are then separated by the first and second filters 38-1 and 38-2. The water, after separation, is returned to the collected fluid reservoir 30 through the pump 32.

At this time, the water returned to the collected fluid reservoir 30 is supplied to the pump 20 by the second feed passage 34 so as to be again jetted into the second expansion chamber 6-2.

By doing this, about 80% of the carbon can be removed from the exhaust gas. In addition, CO, HC and NOx or other products can be removed or reduced. Accordingly, the discharged amount of black smoke can be reduced to obviate a cause for air pollution.

Since the function for collecting carbon as a product is added to the noise eliminator 50, the noise eliminator 50 can be operated to reduce the discharge noise, which is advantageous in view of practical use. Moreover, the layout of the noise eliminator 50 in a limited mounting space in the vehicle becomes easy and there is no fear that the mounting space is increased. In addition, the construction is not overly complicated, manufacturing is easy, and cost can be reduced. This is economically advantageous.

Since the jetting quantity of water can be changed by the control means 36 in accordance with a driving condition of the vehicle, the carbon can be effectively collected and, therefore, the convenience of use is enhanced.

Figure 7:
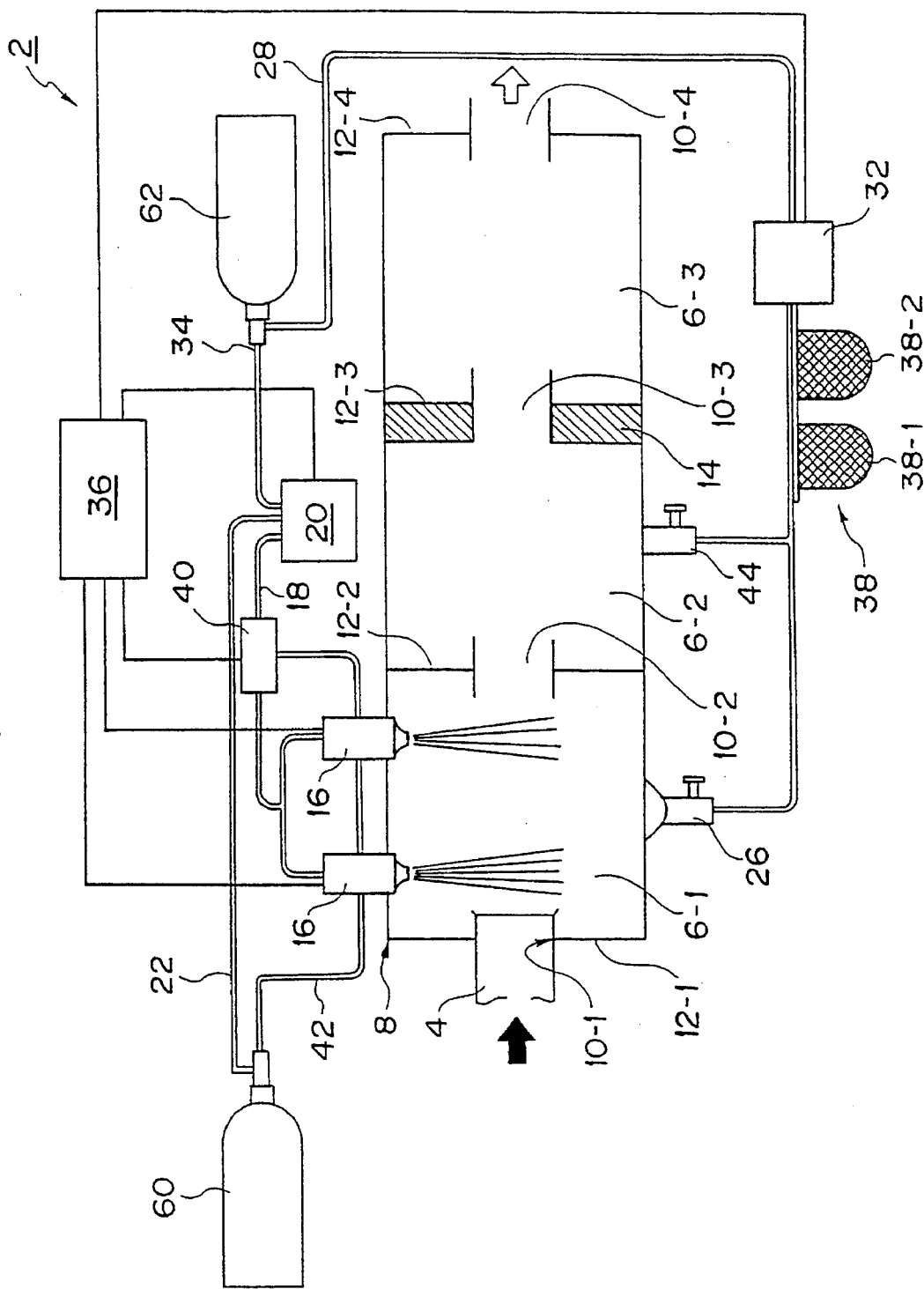
FIG. 7 is a schematic view of a body portion of a system for purifying exhaust gas according to a third embodiment of the present invention.

FIG. 7 shows a third embodiment of the present invention. The feature of this third embodiment is that a gas is used as a jetting fluid instead of a liquid. That is, as a gas, there can be used compressed air, carbonic acid gases, nitrogen gases, furon gases, helium gases, argon gases and other gases. All the gases, as a basis, have a cooling function and a low flammability and are inexpensive. The gases include, among others, those obtained by neutralizing an oxidized exhaust gas in accordance with an alkalizing process and those obtained by being ionized in accordance with an electrolytic process.

As shown in FIG. 7, a fluid reservoir 60 comprises a pressure tank, and a collected fluid reservoir 62 is formed as a pressure tank.

The filter 38 for separating the gas and a product removed from the exhaust gas which is cooled by the gas from the nozzle 16 is provided mid-way of the collection passage 28. Two filters 38-1 and 38-2 are provided mid-way of the collection passage 28 but are located between the collection portions 26 and 44 and the pump 32.

By providing the body portion 8 on the discharge system of a vehicle having a diesel engine, the exhaust gas, which has been oxidized by and mixed with the gas discharged from nozzles 16, can be oxidized by a neutralized or ionized gas. Accordingly, the harmful components from the exhaust gas, such as CO, HC and NOx, can be collected. The discharge amount of the harmful CO, HC and NOx is reduced, and therefore the causes for air pollution can be reduced.

Since the jetting quantity of gas from nozzles 16 can be changed by the control means 36 in accordance with a driving condition of a vehicle (not shown), the NOx as a product can effectively be collected, and therefore the convenience of use is enhanced.

With respect to the jetting gas, by using an inexpensive gas having a cooling function and a low flammability, there is no fear that the gas will be ignited in use, and safety can be improved. Moreover, the cost of gas to be used can be reduced, which is advantageous in view of practical use and economy.

The present invention is not limited to the above-mentioned first to third embodiments, and many changes and modifications can be made.

For example, in the first to third embodiments of the present invention, the operation for collecting the product comprising such harmful components as carbon, CO, HC and NOx is controlled by the control means 36. However, it is possible to start the operation when the ignition switch of the vehicle is turned on, and to stop the operation when the switch is turned off, so that the control means 36 can be omitted.

In the second embodiment of the present invention, the positions of the first to fifth openings as formed in the first to fifth partition walls are as shown in FIGS. 6(a) to 6(e). However, the opening positions may be in symmetrical positions with those of the second embodiment or even other locations as long as the distance of passage of the exhaust gas passing through the noise eliminator can be set large.

Furthermore, in the first embodiment of the present invention, the fluid jetted into the body portion is water. However, it is possible that a chemical product, calcium or others are jetted together with the water so that other harmful components contained in the exhaust gas can be collected together with the carbon.

Moreover, in the first to third embodiments of the present invention, the exhaust gas from a vehicle having a diesel engine is purified. However, it is also possible to provide the exhaust gas purifying system on a discharge system of a vehicle having a normal engine, or on stationary engines, so that the exhaust gas discharged from the engine is purified.

In the second embodiment of the present invention, the exhaust gas purifying system is integrally arranged on the noise eliminator. However, the exhaust gas purifying system may be formed with other parts than the noise eliminator. For example, it is possible to form the exhaust gas purifying system integrally with a catalyst device so that the catalyst device may have the additional function of collecting carbon besides its original function of removing the CO, HC and NOx as harmful components contained in the exhaust gas.

Furthermore, in the first to third embodiments of the present invention, a nozzle is used for jetting a fluid such as a liquid or a gas. Alternatively, it is possible to employ a venturi system in which the flow rate of the exhaust gas is utilized, or a discharge or delivery system in which pressure retained by a fluid is utilized, or other known techniques.

Moreover, it is also possible that the function for collecting carbon by jetting water in accordance with the first embodiment of the present invention is commonly used with the function for collecting harmful components such as CO, HC and NOx by jetting a gas according to the third embodiment of the present invention.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A system for purifying exhaust gas discharged from an engine, comprising a cylindrical body formed by continuously arranging at least three in-line chambers through which the exhaust gas flows and which each are defined between two end walls that are spaced apart in the direction of gas flow and have an opening therethrough for permitting the flow of exhaust gas, a nozzle for jetting a pressurized fluid into at least a first said in-line chamber of said cylindrical body which said first in-line chamber defines an injection and main separation chamber, a pressurizing device for feeding the pressurized fluid through a pressure passage to the nozzle so that the fluid is jetted into said first in-line chamber, a fluid reservoir connected to said pressurizing device through a first feed passage, a first collection portion provided at said first in-line chamber, a collected fluid reservoir portion connected to said first collection portion through a collection passage, a drawing portion disposed in said collection passage to collect the fluid and a product separated from the exhaust gas by the fluid discharged from said nozzle, and a heat retaining wall member of a second said in-line chamber which is disposed immediately downstream of said first in-line chamber and defines a secondary separation chamber, said heat retaining wall member defining said end wall of said second on-line chamber which is disposed downstream of and opposite said end wall disposed between said first and second in-line chambers, said heat retaining wall member retaining heat from said exhaust gas flow to evaporate moisture within said second in-line chamber, said system further comprising a second collection portion in communication with said second in-line chamber and connected to said collection passage through a branch passage to facilitate flow of moisture from said second in-line chamber, said collected fluid reservoir portion and said pressurizing device communicating with each other through a second feed passage, said system further including control means communicating with and controlling said nozzle, said pressurizing device and said drawing portion to purify the exhaust gas, and a third said in-line chamber which is a muffling chamber having means for reducing noise of the exhaust gas flow.

2. A system according to claim 1, wherein said fluid comprises a liquid.

3. A system according to claim 1, wherein said fluid comprises a gas having a cooling function and a low flammability.

4. A system according to claim 1, wherein at least some of said end walls define intermediate partitions which separate adjacent said in-line chambers, each said end wall having said opening therethrough for permitting flow of exhaust gas, the openings in adjacent end walls being disposed in nonaligned relation to cause sideward deflection of the exhaust gas flow.

5. A system according to claim 1, wherein said nozzle is disposed so as to jet the pressurized fluid into said first in-line chamber along a direction which is perpendicular relative to the flow of exhaust gas through the chamber.

6. A system according to claim 5, wherein a plurality of said nozzles are provided in said first in-line chamber for jetting fluid into said first in-line chamber in predetermined directions.

7. A system according to claim 1, wherein the engine is a diesel engine.

8. A system according to claim 1, including a filter associated with said collection passage to separate the product from the fluid.

* * * * *

UNITED STATES PATENT AND TRADEMARK OFFICE
CERTIFICATE OF CORRECTION

PATENT NO. : 5,464,458
DATED : November 7, 1995
INVENTOR(S) : Isao YAMAMOTO

It is certified that error appears in the above-indentified patent and that said Letters Patent is hereby corrected as shown below:

```
Column 9, line 13; change "on-line" to ---in-line---.
```

Signed and Sealed this

Twenty-first Day of May, 1996

*Attest:*

BRUCE LEHMAN

*Attesting Officer*   Commissioner of Patents and Trademarks